(12) United States Patent
Luminet et al.

(10) Patent No.: US 10,071,678 B2
(45) Date of Patent: Sep. 11, 2018

(54) AERIAL LIFT AND METHOD FOR IMPLEMENTING SAME

(71) Applicant: HAULOTTE GROUP, L'horme (FR)

(72) Inventors: Philippe Luminet, Lyons (FR); Sebastian Dittus, Mornant (FR)

(73) Assignee: HAULOTTE GROUP, L'horme (FR)

( * ) Notice: Subject to any disclaimer, the term of this patent is extended or adjusted under 35 U.S.C. 154(b) by 0 days.

(21) Appl. No.: 15/535,387

(22) PCT Filed: Dec. 18, 2015

(86) PCT No.: PCT/EP2015/080648
§ 371 (c)(1),
(2) Date: Jun. 12, 2017

(87) PCT Pub. No.: WO2016/097367
PCT Pub. Date: Jun. 23, 2016

(65) Prior Publication Data
US 2017/0341566 A1 Nov. 30, 2017

(30) Foreign Application Priority Data

Dec. 18, 2014 (FR) ..................... 14 62803

(51) Int. Cl.
*B60Q 1/24* (2006.01)
*B60Q 1/52* (2006.01)
(Continued)

(52) U.S. Cl.
CPC .............. *B60Q 1/245* (2013.01); *B60Q 1/52* (2013.01); *B66F 11/046* (2013.01); *B60Q 1/0483* (2013.01); *B66F 17/006* (2013.01)

(58) Field of Classification Search
CPC .................. B66F 11/04; B60Q 1/26
See application file for complete search history.

(56) References Cited

U.S. PATENT DOCUMENTS 4,309,742 A   1/1982  Holm et al.
5,682,138 A  10/1997  Powell et al.
(Continued)

FOREIGN PATENT DOCUMENTS

DE   29 24 820 A1    1/1981
DE  203 12 419 U1  10/2003
(Continued)

OTHER PUBLICATIONS

International Search Report, dated Feb. 25, 2016, from corresponding PCT application No. PCT/EP2015/080648.
(Continued)

*Primary Examiner* — Alexander Garlen
(74) *Attorney, Agent, or Firm* — Young & Thompson; Eric Jensen; Andrew Patch

(57) ABSTRACT

Disclosed is an aerial lift, including: a lower portion with members for ground connection; a lifting structure; a platform supported by the lifting structure; and a lighting system. The aerial lift includes a control console on the platform, whose position is variable relative to the ground connection members. The lighting devices are arranged on the lower portion of the aerial lift and/or on the lifting structure or the platform and selectively generate light beams directed towards the ground and the immediate environment of the aerial lift, including at least partially an area beyond the edge of the members for connecting to the ground. The light beams are directed towards four sides, consisting of two opposing pairs of sides, of the aerial lift regardless of the position of the control console relative to the members for connecting to the ground. Also disclosed is a method for implementing such an aerial lift.

10 Claims, 9 Drawing Sheets

(51) Int. Cl.
*B60Q 1/04* (2006.01)
*B66F 11/04* (2006.01)
*B66F 17/00* (2006.01)

(56) References Cited

U.S. PATENT DOCUMENTS

| | | | |
|---|---|---|---|
| 6,208,260 B1 * | 3/2001 | West | B66C 15/06 |
| | | | 340/5.1 |
| 2002/0190849 A1 * | 12/2002 | Orzechowski | B66F 9/0755 |
| | | | 340/435 |
| 2012/0025964 A1 | 2/2012 | Beggs et al. | |
| 2012/0327261 A1 * | 12/2012 | Tafazoli Bilandi | E02F 9/24 |
| | | | 348/222.1 |
| 2013/0265789 A1 | 10/2013 | Amsley et al. | |

FOREIGN PATENT DOCUMENTS

| | | |
|---|---|---|
| DE | 10 2012 024 494 A1 | 6/2014 |
| EP | 2 374 635 A1 | 10/2011 |
| FR | 2909084 A1 | 5/2008 |

OTHER PUBLICATIONS

French Search Report dated Oct. 16, 2015, from corresponding FR application No. 1462803.

* cited by examiner

AERIAL LIFT AND METHOD FOR IMPLEMENTING SAME

The present invention relates to an aerial lift. The invention also relates to a method for implementing such an aerial lift. The field of the invention is that of cherry pickers.

EP-A-2,374,635 describes one example aerial lift, comprising a motorized chassis provided with wheels, a tower pivoting 360° on the chassis, a crane articulated on the tower, and a moving platform arranged at the end of the crane.

As described in DE-A-29 24 820, the platform can be equipped with a work light allowing the user to light the elevated zone where he is performing work. The lift can also be equipped with an emergency rotating light, generally placed on the tower or the chassis, making it possible to indicate that the machine is in use.

On other types of worksite vehicles, such as rotary telescoping carriages, the chassis or the tower is equipped with driving lights projecting beams of light toward the front and rear for travel on the public roadway.

Generally, an aerial lift is delivered or collected to the usage site early in the morning or late at night, being transported on the trailer of a transport vehicle. An operator unloads the lift from the trailer, or loads the lift on the trailer, via a ramp. These operations involve an accident risk, in particular when the lighting conditions and/or weather conditions are poor. For example, the operator may need to steer the lift at night, when the position of the wheels relative to the edge of the ramp is difficult to discern. During these operations, the use of traditional driving lights would not procure optimal visibility for the operator.

In this context, it is known to equip the trailer or the ramp with lighting devices, for example strips of light-emitting diodes (LED). However, this requires modifying the transport equipment, since most often it is not equipped with such devices. Furthermore, these devices do not procure optimal visibility for the operator. The risk of accident is therefore still present.

US-A-2013/0265789 describes an example of a transport vehicle, comprising a removable trailer to form a loading ramp. The trailer is equipped with lighting devices.

Alternatively, it is possible to consider lighting the lift and its immediate environment with projectors placed on the ground. However, such projectors are not always available, since they represent an increase in the material to be purchased and stored, and therefore an extra cost. Furthermore, placing such projectors before moving the lift and storing them after having moved the lift take time.

Additionally, an aerial lift travels in a work environment where it may perform maneuvers in all directions to reach the work zone. In this case, it is necessary to verify the absence of obstacles and holes over the entire periphery of the machine, and not only in front of the chassis. If the lighting conditions and/or weather conditions are poor, the operator finds it difficult to distinguish such obstacles or holes.

The aerial lifts used inside buildings are generally equipped with practically silent electric motors. In this case, an emergency rotating light is used so that people near the lift can recognize that an operation is in progress. Nevertheless, it is not always possible to position an emergency rotating light such that its light beam is perceived by people nearby, irrespective of their position.

US-B-5,682,138 describes a lighting system for a vehicle such as a truck, comprising a projector suitable for illuminating the rear wheels of the vehicle and the ground alongside the vehicle. Such a system is not suitable for aerial lifts.

The aim of the present invention is to resolve the aforementioned drawbacks.

To that end, the invention relates to an aerial lift, comprising: a lower portion, provided with members for connecting to the ground; a lifting structure; a platform supported by the lifting structure; and a lighting system including lighting devices other than driving lights. The aerial lift is wherein it comprises a control console positioned on the platform and the position of which relative to the members for connecting to the ground is variable, and in that the lighting devices are arranged on the lower portion of the aerial lift and/or on the lifting structure or on the platform and selectively generate colored light beams pointed toward the ground and the environment immediately surrounding the aerial lift, at least partly including a zone comprised between 0 and 1 meter from the edge of the members for connecting to the ground, these light beams being oriented toward four opposite sides, in pairs, of the aerial lift irrespective of the position of the control console relative to the members for connecting to the ground.

The invention thus makes it possible to have a high-performing lighting system that is simple and practical to implement, suitable for illuminating the ground and the immediate environment of the lift. An operator present on the platform of the aerial lift to control its movements benefits from a clear view of the vicinity of the lower portion in all directions, irrespective of the orientation of the platform relative to the lower portion. In particular, the lighting system makes it possible to eliminate the trailer and the ramp of the transport vehicle during the loading or unloading of the lift. Under low lighting and visibility conditions, these operations are therefore secured. Furthermore, the invention can be implemented during operations and movements of the lift on a worksite, even during the day, in order to warn people around the lift of the operating conditions, and in particular of emergency situations. The invention therefore makes it possible to reduce accident risks, which meets a crucial safety demand.

Compared with traditional driving lights, the lighting devices according to the invention provide improved visibility around the lift. Compared with lighting devices equipping the trailer and the ramp, the lighting devices according to the invention do not require modifying the transport equipment and provide better visibility around the lift. Compared with projectors needing to be installed around the lift, the lighting devices according to the invention are immediately ready to use if needed and are movable with the lift. Furthermore, the lighting devices according to the invention can perform additional advantageous functions, as will be seen from the following description.

According to other advantageous features of the invention, considered alone or in combination:
- The light beams project markings on the ground defining a flagged zone around the aerial lift.
- At least one of the markings on the ground includes a figurative shape, for example a danger symbol.
- The lighting devices selectively generate light beams pointed toward the ground and the environment immediately surrounding the aerial lift, at less than ten meters from the members for connecting to the ground.
- The lighting devices at least partially light the members for connecting to the ground.

The lighting system comprises at least one lighting device arranged on a front side of the lower portion, in particular on a front side of a tower belonging to the lower portion.

The lighting system comprises at least one lighting device arranged on a lateral side of the lower portion, in particular on a lateral side and the bottom of a tower belonging to the lower portion.

The lighting system comprises at least two lighting devices arranged on the lateral sides of the lower portion, one on each side.

The lighting system comprises at least one lighting device arranged on a front side and the bottom of the platform.

The lighting system comprises at least one lighting device arranged on a lateral side and the bottom of the platform.

The lighting system comprises at least one lighting device arranged on the bottom of the lifting structure.

The lighting system comprises at least one lighting device arranged on a lateral, front or rear side of the lifting structure.

The light beams generated by the lighting devices are inclined relative to the ground by angles comprised between 20 degrees and 90 degrees, inclusive.

At least one of the lighting devices generates colored light beams, the color of which depends on the operating conditions of the aerial lift.

The lighting system comprises lighting devices suitable for illuminating the ground and the immediate environment of the aerial lift over 360 degrees.

The invention also relates to a method for using an aerial lift as described above. The method is wherein during a maneuvering operation on a worksite, for loading or unloading of the aerial lift, the lighting devices generate light beams pointed toward the ground and the environment immediately surrounding the aerial lift, at least partly including a zone comprised between 0 and 1 meter of the edge of the members for connecting to the ground, these light beams being oriented toward four opposite sides, in pairs, of the aerial lift.

The invention will be better understood upon reading the following description, provided solely as a non-limiting example and done in reference to the appended drawings, in which:

FIGS. 1 to 14 show an aerial lift 1 according to the invention.

Figure 1:
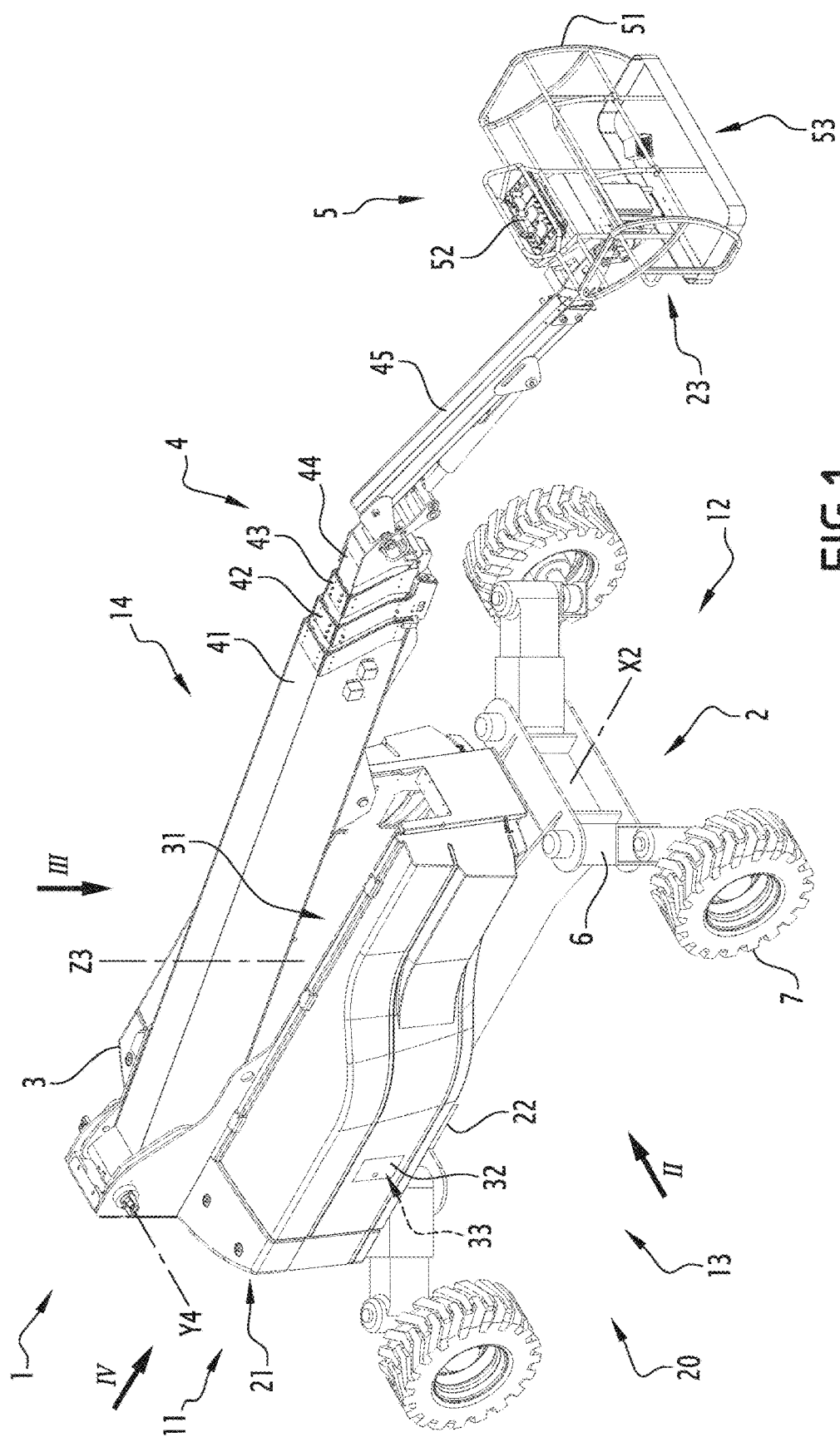
FIG. 1 is a perspective view of an aerial lift according to the invention.

The lift 1 comprises a rolling chassis 2, a tower 3, a telescoping arm 4 and a platform 5. The chassis 2 and the tower 3 make up the lower portion of the lift 1, while the telescoping arm 4 makes up the lifting structure of the lift 1. The lift 1 has a front side 11, a rear side 12, a left side 13 and a right side 14. The lift 1 is provided to be driven by an operator 10 positioned on the platform 5. The operator 10 is shown schematically, only in FIGS. 7, 9 and 13, for simplification reasons.

The chassis 2 extends along a longitudinal axis X2. The chassis 2 is provided with axles 6 supporting wheels 7, allowing the lift 1 to translate over a surface on the ground S. The wheels 7 form members for connecting to the ground S of the lift 1. In the example of the figures, the axles 6 are telescoping and articulated in rotation on the chassis 2. Nevertheless, in practice, the axles 6 can have any configuration adapted to the targeted application. In particular, the axles 6 can be straight axles, and may or may not be telescoping. The motor means of the chassis 2, not shown, can comprise an internal combustion engine or an electric motor. An electronic central management unit, a hydraulic reservoir, a fuel tank and/or a set of electric batteries can also be mounted on the chassis 2.

The tower 3 is mounted on the chassis 2, while being rotatable over 360 degrees around a vertical axis Z3. Preferably, the tower 3 is actuated by hydraulic means, not shown. The tower 3 includes a longitudinal housing 31 provided to receive the arm 4 in the idle position. The tower 3 also includes a side flap 32 removably covering a control console 33.

The telescoping arm 4 is mounted on the chassis 3, while being articulated in rotation around a horizontal axis Y4. The arm 4 comprises several elongate boxes 41, 42, 43 and 44, nested in one another. Alternatively, the arm 4 can be a lifting arm, articulated or of any known type. A parallelogram structure 45, supporting the platform 5, is arranged at the end 44 of the arm 4.

The platform 5 is provided to receive a load, in particular people and equipment. The platform 5 comprises a basket 51 and a control console 52 positioned on the front side 11 of the basket 51. Moving on the ground S, when the tower 3 is oriented at 0 degrees, the operator 10 of the lift 1 is positioned in the basket 51 of the platform 5 and looks toward the front side 11 of the lift 1. The basket 51 is formed by different vertical and horizontal uprights. The basket 51 is provided with an access door 53 situated on the rear side 12.

During the operation of the aerial lift 1, the position of the control console 52, and more generally the control unit, i.e., the zone of the basket 51 where the operator stands to control the aerial lift 1, using the control console 52, varies relative to the members for connecting to the ground according to the movement of the lifting structure.

The lift 1 is also equipped with a lighting system 20, making it possible to light the ground S and the environment close to the lift 1, at less than ten meters from the wheels 7. Since the projected light rays are generally diffuse, it is specified that the lighting system 20 is provided essentially to light within less than five meters from the wheels 7. In other words, at least 50% of the light intensity protected by the lighting system 20 is concentrated within less than five meters of the wheels 7.

In particular, the lighting system 20 aims to light at least part of a zone comprised between 0 and 1 meters from the edge of the wheels 7, around the lift 1. In the case at hand, the edge of the wheels 7 designates their outer envelope, on the side opposite the chassis 2. Preferably, the lighting system 20 at least partially lights the wheels 7.

Thus, the system 20 makes it possible to improve the visibility of the operator 10 positioned on the platform 5 and to facilitate his maneuvers, both during a loading or unloading operation of the lift 1 and during a maneuvering operation on the worksite. Furthermore, during the work at height done by the operator 10, the system 20 makes it possible to notify people on the ground S of the operation in progress, or to warn them in case of emergency.

The lighting system 20 comprises several lighting devices 21, 22 and 23, positioned on the tower 3 and the platform 5. In the example of the figures, two devices 21 are positioned on the front of the tower 3, two devices 22 are positioned on the sides and the bottom of the tower 3, while one device 23 is positioned on the front and bottom of the platform 5.

Figure 2:
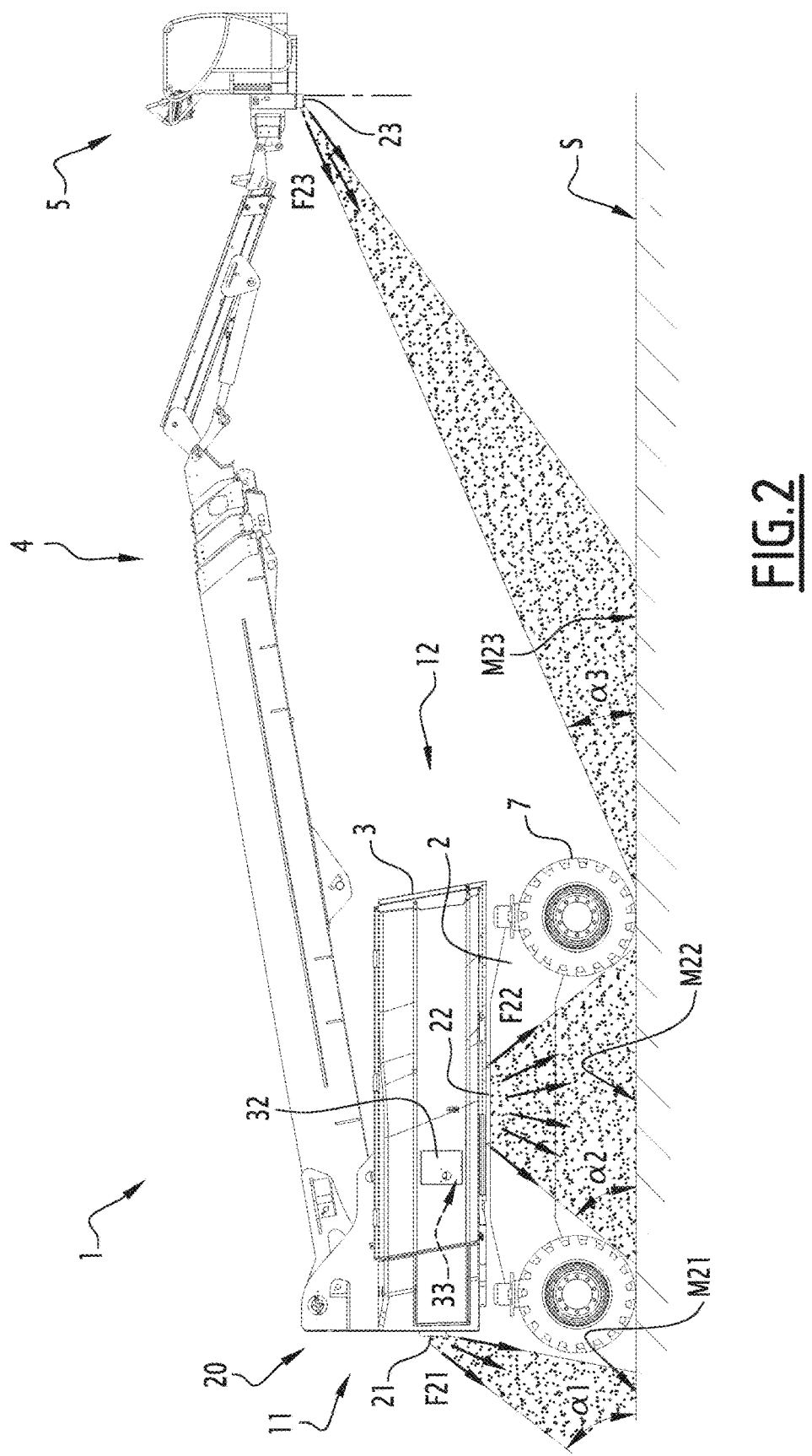
FIG. 2 is a side view along arrow II in FIG. 1.
Figure 3:
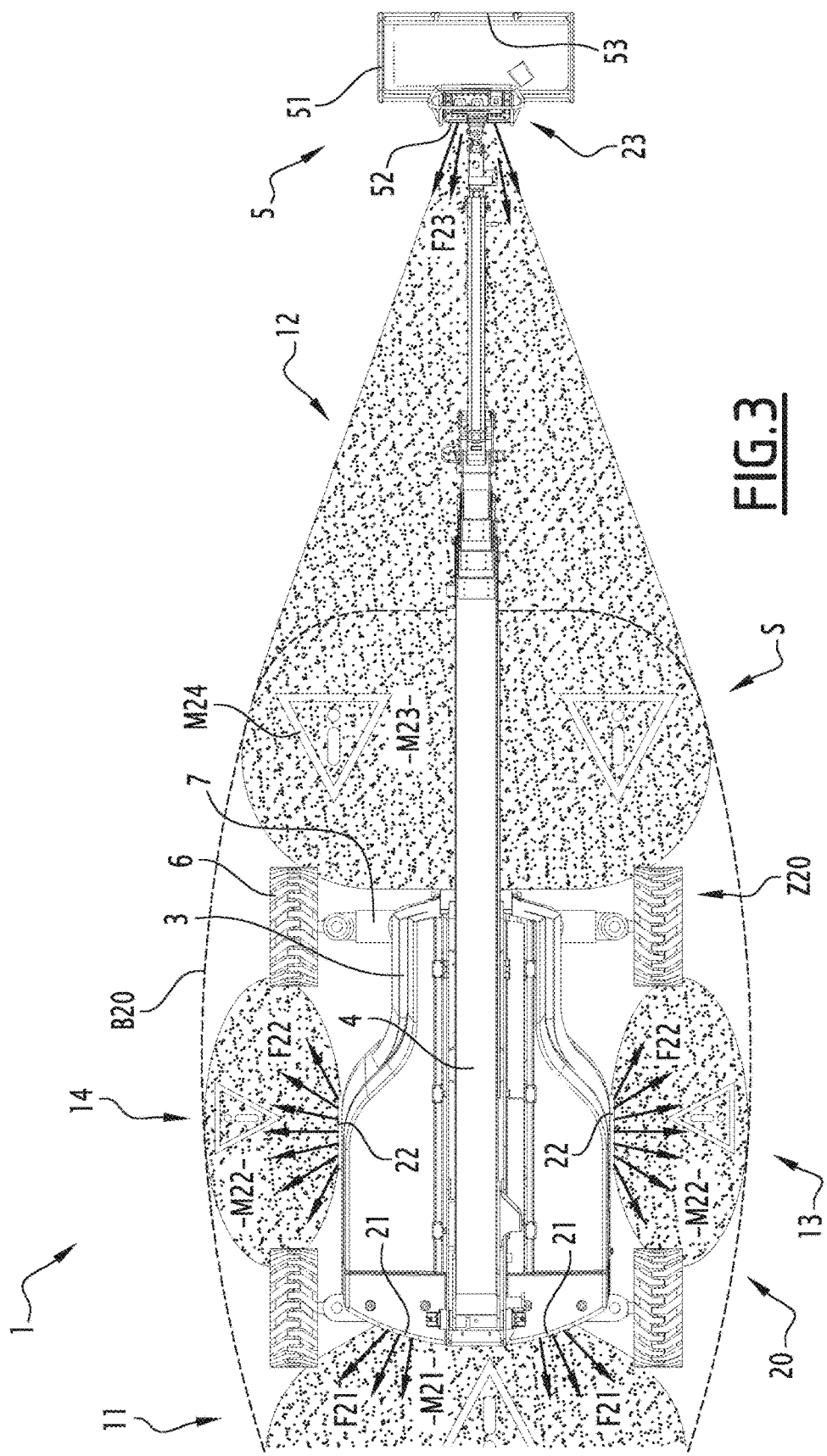
FIG. 3 is a top view along arrow III in FIG. 1.
Figure 4:
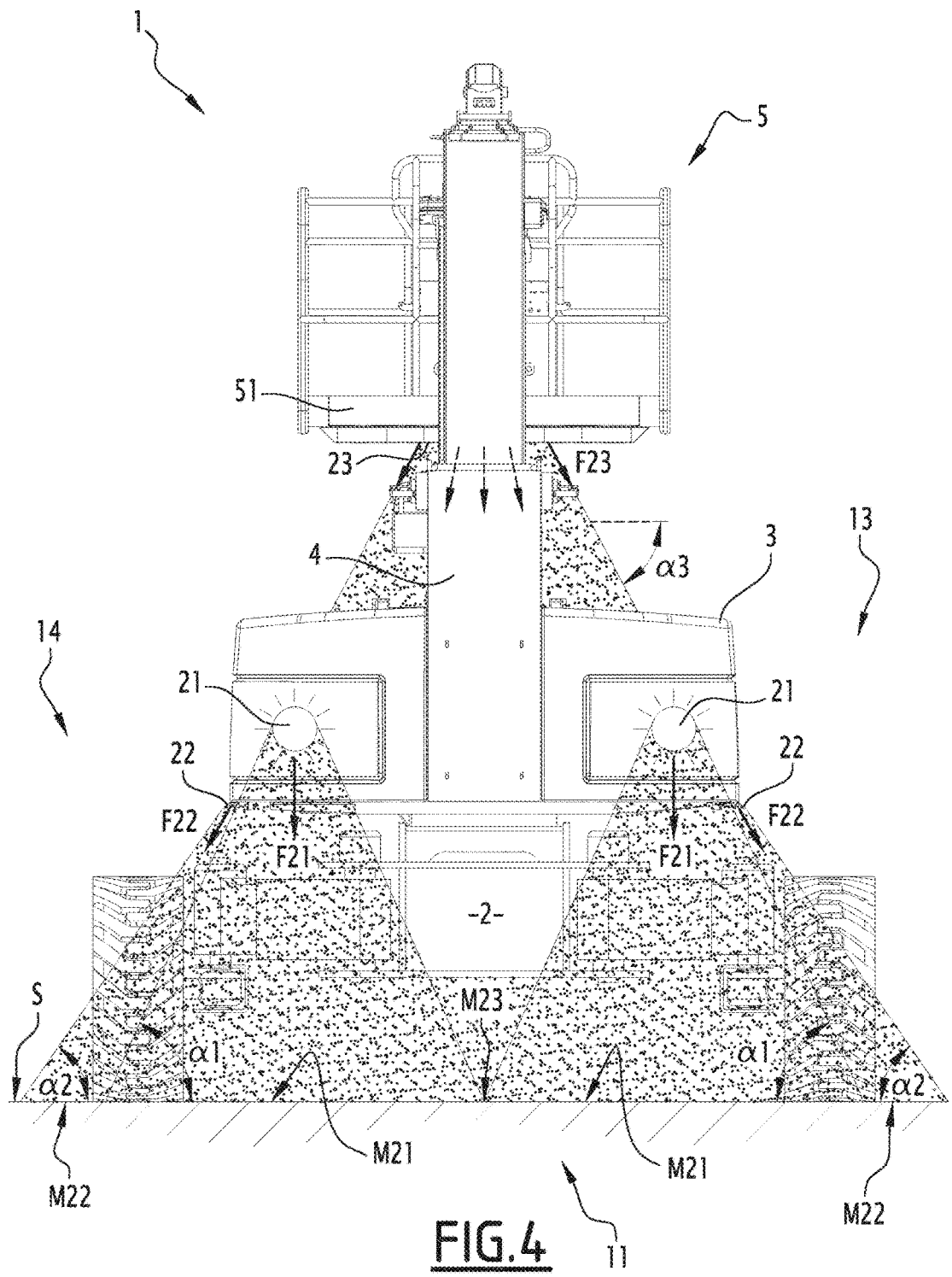
FIG. 4 is a front along arrow IV in FIG. 1.
Figure 5:
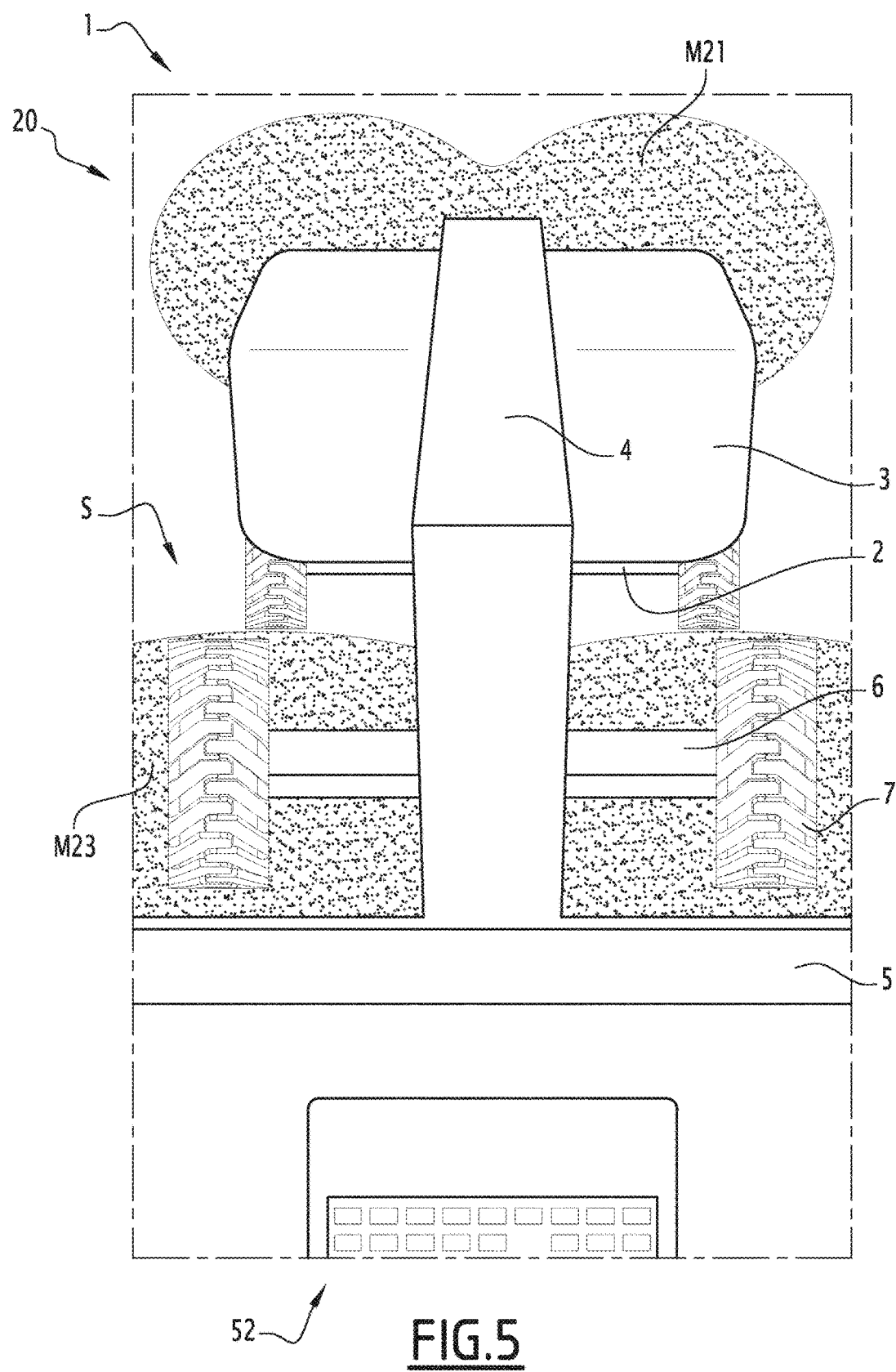
FIG. 5 is an elevation view from the perspective of an operator positioned in the basket of the lift, the lift being shown schematically for simplification purposes.
Figure 6:
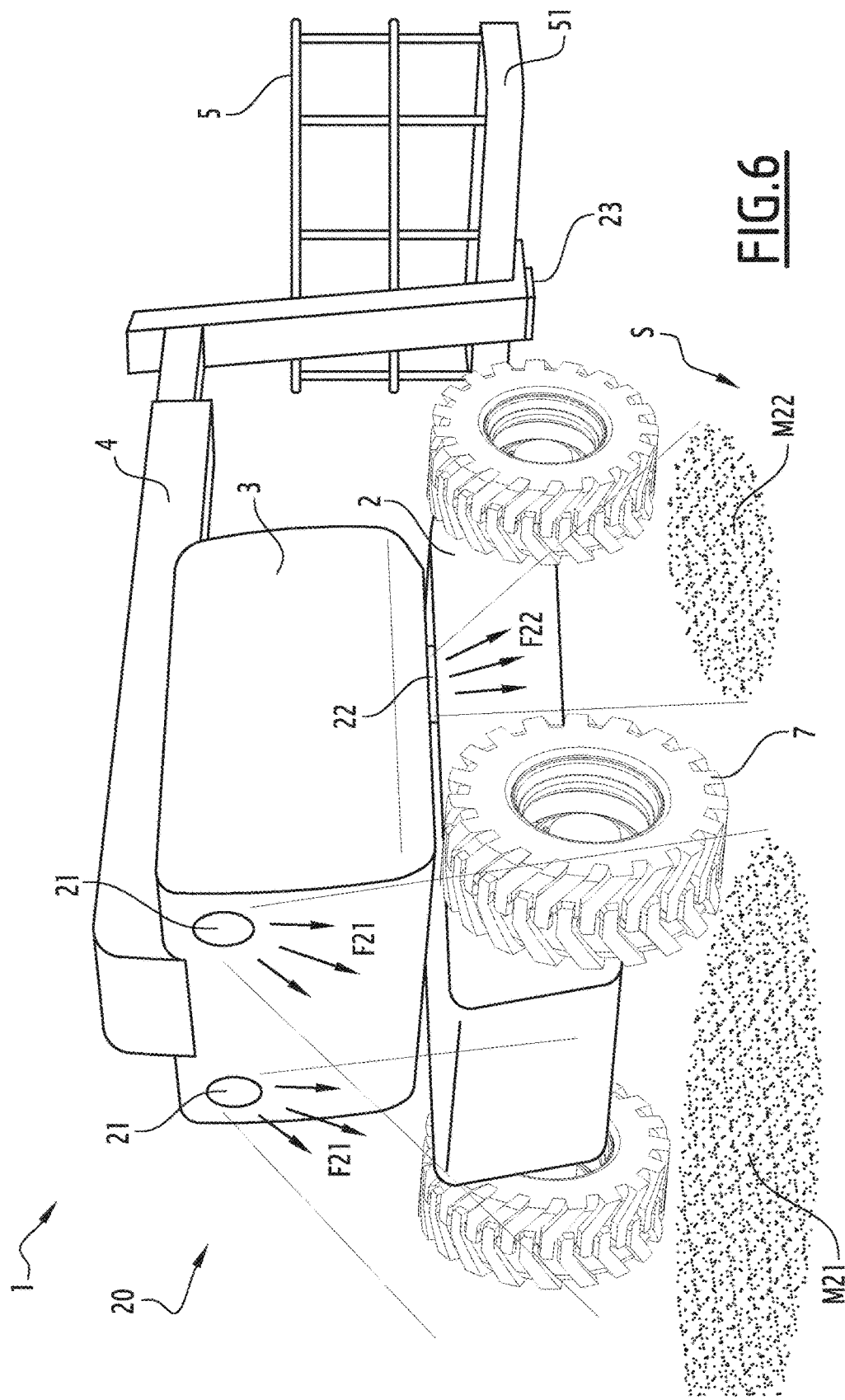
FIG. 6 is another schematic illustration of the lift, in perspective view.

As shown in FIGS. 3 to 6, the devices 21, 22 and 23 generate light beams F21, F22 and F23 projecting marks M21, M22 and M23 on the ground S. In FIGS. 2, 3 and 4, all of the devices 21, 22 and 23 are illuminated. In FIG. 5, the devices 21 and 23 are illuminated, but not the devices 22. In FIG. 6, the devices 21 and 22 are illuminated, but not the device 23.

The devices 21, 22 and 23 are configured to illuminate the ground S and the immediate surroundings of the lift 1. The beams F21 are oriented globally toward the front of the tower 3, such that when the tower 3 is in the straight position relative to the chassis 2, the marks M21 are situated on the front side 11 of the lift 1. The beams F22 are oriented globally on the sides of the front of the tower 3, such that when the tower 3 is in the straight position relative to the chassis 2, the marks M22 are situated on the lateral sides 13 and 14 of the lift 1. The beams F23 are oriented globally toward the front of the platform 5, such that when the tower 3 is in the straight position relative to the chassis 2, with the mast 4 and the platform 5 situated in the extension of the rear side, the mark M23 is situated on the rear side 12 of the lift 1.

The lighting system thus allows an operator controlling the movements of the aerial lift 1 a clear view of the vicinity of the lower portion, illuminated on four sides 11, 12, 13 and 14, opposite in pairs, irrespective of the orientation of the control console 52 relative to the members for connecting to the ground.

In the examples of FIGS. 2 and 3, the light beams F21, F22 and F23 are inclined relative to the ground S by angles $\alpha 1$, $\alpha 2$ and $\alpha 3$ comprised between 20 and 90 degrees, inclusive. More specifically, as shown in FIGS. 2 and 3, each device 21, 22 and 23 generates light beams F21, F22 and F23 that are inclined relative to the ground S by a set of angles $\alpha 1$, $\alpha 2$ and $\alpha 3$ comprised between 20 and 90 degrees, inclusive, irrespective of the considered direction. In particular, the angles al are comprised between 50 and 75 degrees, the angles $\alpha 2$ are comprised between 50 and 65 degrees, and the angles a3 are comprised between 25 and 35 degrees. For a lift 1 traveling at no more than 6 kilometers/hour and braking over two meters, the beams F21, F22 and F23 are oriented to light at least five meters from the chassis 2. More specifically, the beams F21, F22 and F23 are oriented to light at least part of the zone comprised between 0 and 1 meters from the edge of the wheels 7. As shown in FIGS. 2 and 3, the marks M21, M22 and M23 on the ground cover this zone partially, but not completely. Preferably, to facilitate maneuvers, the marks M21, M22 and M23 extend partly below and around the wheels 7.

Compared with the lighting system 20 according to the invention, the beams projected by the driving lights equipping motor vehicles are provided to provide light, with low beams, at least thirty meters from the chassis. These driving lights are thus generally inclined relative to the ground S, with low beams, by angles comprised between 3 and 15 degrees, inclusive. The driving lights do not illuminate the ground S near the wheels.

Preferably, the devices 21, 22 and 23 are stationary, i.e., the orientation of the beams F21, F22, F23 is fixed. Alternatively, the devices 21, 22 and 23 can be configured to be able to orient their beams F21, F22, F23. In other words, the devices 21, 22 and 23 can project multi-directional beams F21, F22 and F23. In this case, the angles $\alpha 1$, $\alpha 2$ and $\alpha 3$ are adjustable.

As in particular shown in FIG. 3, the marks M21, M22 and M23 are projected by the lighting system 20 around the entire lift 1. Thus, the marks M21, M22 and M23 define a flagged zone Z20 around the lift 1, embodied by a fictitious barrier B20 shown in broken lines in FIG. 3. The invention thus makes it possible to improve the safety of people close to the lift 1.

According to one embodiment of the invention that is not illustrated, the lighting system 20 may comprise lighting devices suitable for generating beams of light illuminating the vicinity of the lower portion of the aerial lift 1 over 360°, so as to project an illuminated mark on the ground forming a continuously illuminated zone.

According to one particular embodiment shown in FIG. 3, the lighting devices 21, 22 and 23 include a partial closing system, such as a mask having a distinctive shape. The masks make it possible to show distinctive shapes on the ground S in the marks M21, M22 and M23. The distinctive shape can be a symbol, a logo or text. The distinctive shape can in particular depict a danger symbol M24, as shown in the example of FIG. 3. Thus, the system 20 makes it possible to provide richer information to people close to the lift 1 to allow them to adopt appropriate behavior. The mask can be stationary, or designed to be removable depending on the situation. According to one alternative, only some of the devices 21, 22 or 23 are equipped with a mask.

The lighting system 20 can be configured such that when the lift 1 is started up, at least some of the devices 21, 22 and 23 are automatically illuminated. During use, each of the devices 21, 22 and 23 can selectively be illuminated or extinguished, as chosen by the operator 10. The lighting system 20 can also include a safety device provided to illuminate all or some of the lighting devices 21, 22 and 23 automatically in case of emergency.

Furthermore, at least some of the devices 21, 22 and 23 can be configured to project dynamic signals, in the form of specific lighting, such as changes in color or intermittent bursts of light. These dynamic signals can be activated in case of emergency, or depend on the movements of the lift 1 or its component elements, for example during the translation of the chassis 2 or the lowering of the platform 5. These dynamic signals make the lighting system 20 even more visible, which further improves the safety of people close to the lift 1, as well as the safety of the operator, in particular in emergency situations.

The devices 21, 22 and 23 can assume the form of traditional headlights, as is the case of the devices 21 in the figures. In this case, these headlights nevertheless do not serve as traditional driving lights. Alternatively, the devices 21, 22 and 23 can each assume the form of a housing including a case, a glass pane, as well as one or several bulbs or light-emitting diodes (LED) arranged in the case and projecting beams of light through the glass pane. Advantageously, the LEDs have a long life and require practically no upkeep.

For each device 21, 22 and 23, the bulbs or diodes can be arranged in a particular pattern. Thus, the lighting system 20 has a particular visual signature, reinforcing the visual identity of the lift 1.

The lift 1 can comprise other auxiliary lighting devices, for example to light the operating zone at height of the operator 10. Alternatively, the devices 21, 22 or 23 can be configured to be able to orient their beams F21, F22, F23 in order to light the operating zone at height.

FIGS. 7 to 14 show different operating conditions C1, C2, C3 and C4 of the lift 1, in particular emergency situations. FIGS. 7, 9, 11 and 13 are schematic illustrations of different work or emergency situations. FIGS. 8, 10, 12 and 14 are partial schematic illustrations of the lift 1 shown in FIG. 6, respectively corresponding to the situations of FIGS. 7, 9, 11 and 13, with different colored light beams FC1, FC2, FC3 and FC4.

Advantageously, at least some of the colors used correspond to conventions known by the general public, in particular used on automobile dashboards:
  green: normal situation,
  orange: malfunction not requiring an immediate stop,
  red: danger requiring an immediate stop.

Figure 7:
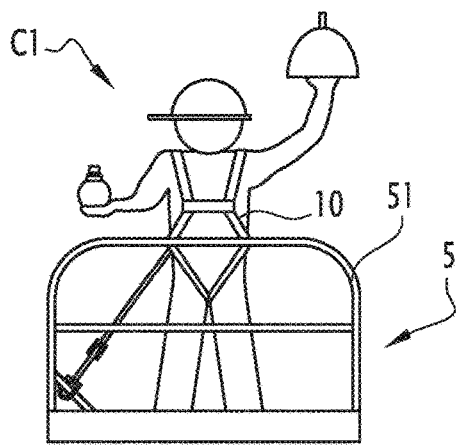
FIG. 7 is a schematic view of an operator positioned in the basket of the lift, in the working situation.
Figure 8:
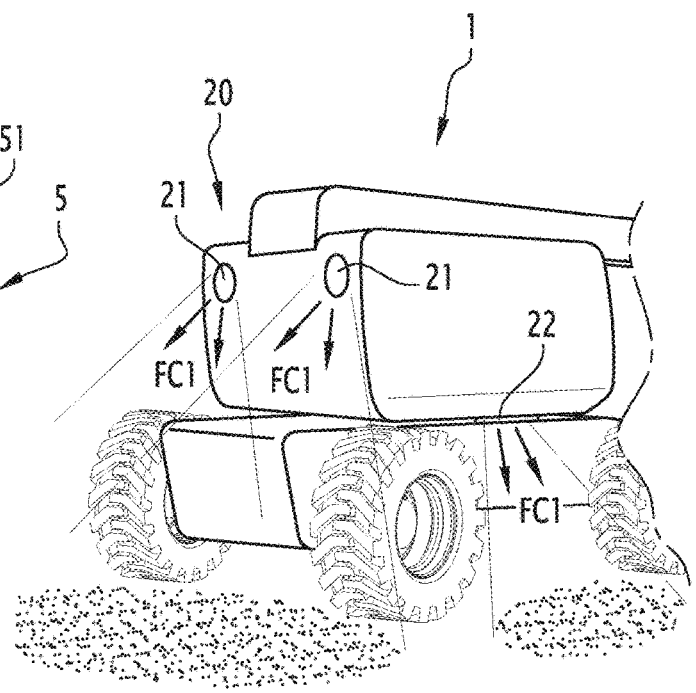
FIGS. 8, 10, 12 and 14 are partial schematic illustrations of the lift, respectively corresponding to the situations of FIGS. 7, 9, 11 and 13, with different colored light beams.

In FIG. 7, the operator 10 is positioned in the basket 51 of the lift 1, in a work situation, or condition C1. In FIG. 8, the devices 21 and 22 are projecting green beams FC1. Thus, owing to the system 20, the people on the ground S near the lift 1 can easily recognize that an operation is underway, and behave accordingly.

Figure 9:
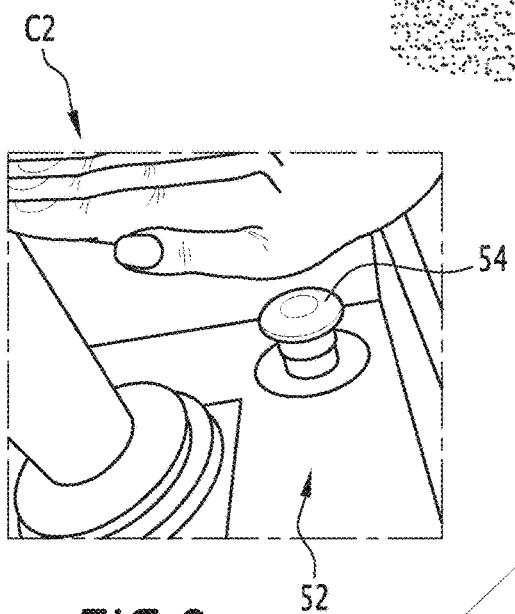
FIG. 9 is a schematic illustration of the operator pressing on a stop button, in an emergency stop situation.
Figure 10:
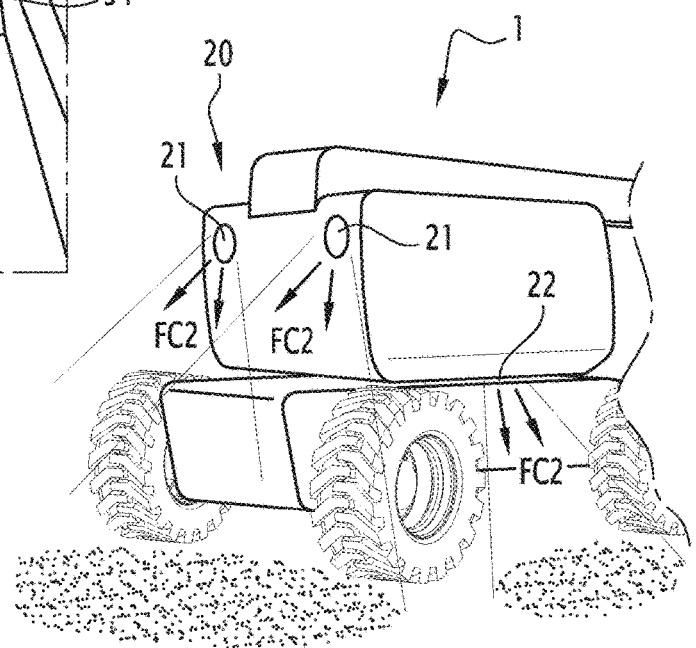

In FIG. 9, the hand of the operator 10 is preparing to press an emergency stop button 54 equipping the control console 52. The emergency stop mode of the lift 1 is then activated, which corresponds to condition C2. In FIG. 10, in this emergency stop mode, the devices 21 and 22 project red beams FC2. Thus, owing to the system 20, the people on the ground S near the lift 1 can easily recognize that the emergency stop mode has been activated, and react accordingly. The emergency stop mode can also be activated by other safety devices of the lift, in particular a load limiter on the platform or an incline manager of the chassis. These safety devices are traditional and will therefore not be described in more detail.

Figure 11:
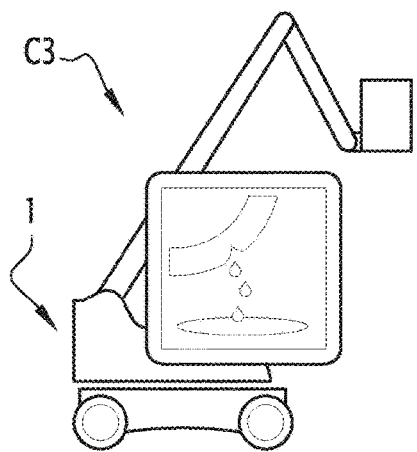
FIG. 11 is a schematic illustration of the lift, in an outage situation.
Figure 12:
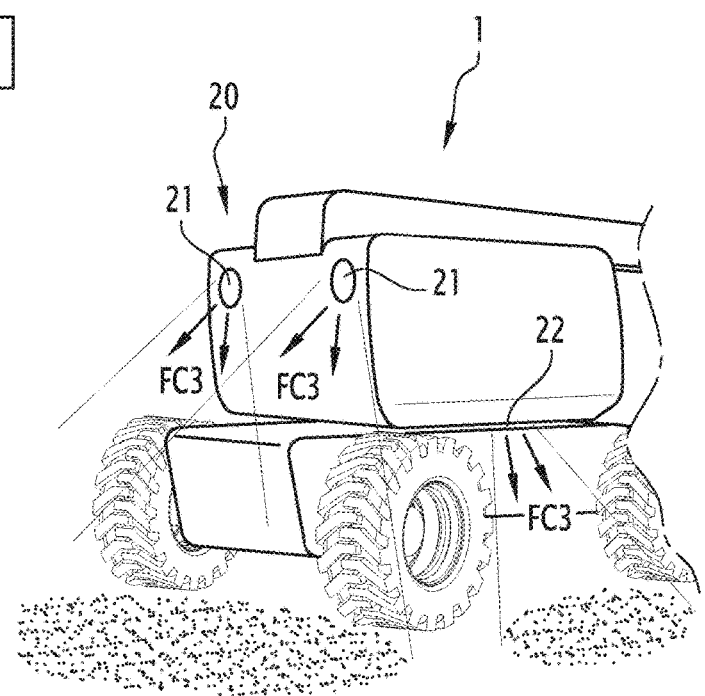

In FIG. 11, the lift 1 is shown in an outage situation, or condition C3. In FIG. 12, the devices 21 and 22 are projecting orange beams FC3. Thus, owing to the system 20, the people on the ground S near the lift 1 can easily recognize that the lift 1 is out of order, and react accordingly.

Figure 13:
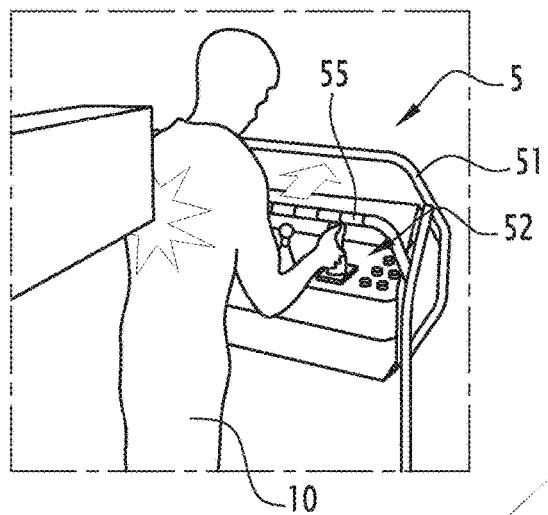
FIG. 13 is a schematic illustration of the operator positioned in the basket of the lift, in an accident situation.
Figure 14:
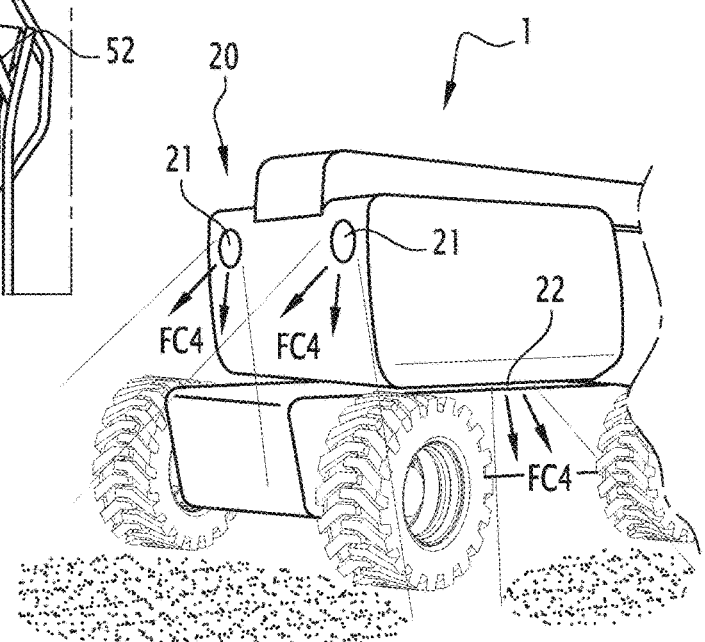

In FIG. 13, the operator 10 is positioned in the basket 51 of the lift 1, when an accident occurs. In the case at hand, the operator 10 working at height in the basket 51 accidentally collides with a beam during a movement of the platform 5. A safety system, for example a removable bar 55 positioned between the operator 10 and the control console 52, then makes it possible to activate an accident mode of the lift 1, or condition C4. In FIG. 14, the devices 21 and 22 are projecting blue beams FC4. Thus, owing to the system 20, the people on the ground S near the lift 1 can easily recognize the accident at height situation, and react accordingly.

Thus, according to one advantageous embodiment of the invention, at least one of the lighting devices 21, 22 and 23 is configured to generate colored light beams FC1, FC2, FC3, FC4, the color of which depends on the operating conditions C1, C2, C3, C4 of the lift 1. Preferably, at least some of the devices 21, 22 and 23, or even all of the devices 21, 22 and 23, are configured to generate colored light beams FC1, FC2, FC3 and FC4.

To that end, the devices 21, 22 or 23 preferably comprise a set of diodes with different colors. Different colors can be projected by the same device 21, 22 or 23, with a different color for each operating condition C1, C2, C3, C4 of the lift 1. The set of devices 21, 22 and 23 projects a given color for a particular operating condition C1, C2, C3, C4 of the lift 1.

In comparison, it is known to equip a machine with a screen device displaying an image, to indicate to people in the immediate environment of the machine that the latter is powered on or that the chassis is moving.

Figure 15:
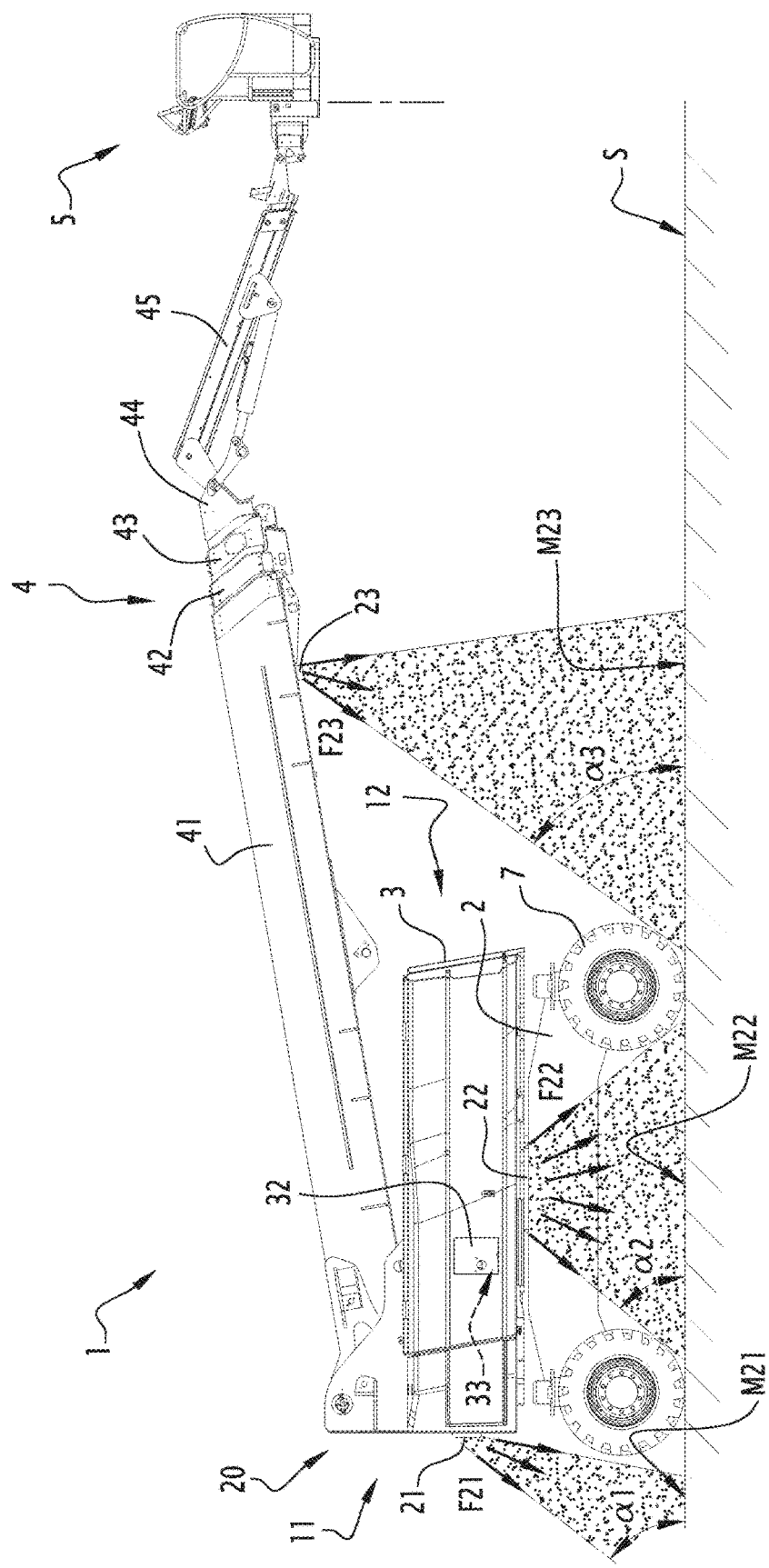
FIG. 15 is a view similar to FIG. 2, showing a second embodiment of a lift according to the invention.

FIG. 15 shows an aerial lift 1 according to a second embodiment of the invention. The component elements similar to those of the first embodiment bear the same numerical references. The device 23 is positioned below the lifting structure 4, more specifically below the box 41, instead of being positioned on the platform 5. Alternatively, the device 23 can be positioned in another location of the lifting structure 4.

Furthermore, the aerial lift 1 can be configured differently from FIGS. 1 to 15 without going beyond the scope of the invention. In particular, the lighting system 20 can have any configuration adapted to the targeted application. According to one particular alternative that is not shown, the members for connecting to the ground S equipping the rolling chassis 2 can be tracks instead of wheels 7.

In practice, the aerial lift 1 can be an articulated arm lift, a telescoping arm lift, a vertical mast lift, a scissor lift. In the case of scissor lifts and vertical mast lifts, the control console is movable in the platform to better visually monitor the absence of obstacles on each side of the chassis. The control console can be removed from its location and be fastened on an opposite edge of the platform.

Depending on its construction and its dimensions, the lift 1 can be implemented for maintenance or pruning work, for warehouse inventory, for naval, demolition or construction worksites, or for upkeep and finishing of works of art, etc.

Irrespective of the embodiment, the lift 1 includes a lower portion 2+3 provided with members 7 for connecting to the ground S, a lifting structure 4, a platform 5 and a lighting system 20. The lighting system 20 comprises different lighting devices 21+22 other than driving lights, which are arranged on the lower portion 2+3 of the aerial lift 1 and selectively generate light beams F21+F22 oriented toward the ground S in the immediate environment of the aerial lift 1, including at least part of a zone comprised between 0 and 1 meters from the edge of the members 7 for connecting to the ground S.

Furthermore, the technical features of the different embodiments and alternatives mentioned above can be combined with one another in whole or in part. Thus, the aerial lift 1 can be adapted in terms of cost, functionalities and performance.

The invention claimed is:

1. An aerial lift, comprising: a lower portion equipped with members for connecting to the ground; a lifting structure; a platform supported by the lifting structure; and a lighting system including different lighting devices, other than driving lights; wherein the lighting system comprises a control console positioned on the platform, the position of the platform and the lifting structure relative to the members for connecting to the ground is variable; the lighting devices are arranged on the lower portion of the aerial lift and additionally on at least one of the lifting structure and the platform and selectively generate colored light beams pointed toward the ground and the environment immediately surrounding the aerial lift, at least partly including a zone between 0 and 1 meter from the edge of the members for connecting to the ground, the light beams being oriented toward four opposite sides, in pairs, of the aerial lift irrespective of the position of the control console relative to the members for connecting to the ground.

2. The aerial lift according to claim 1, wherein the light beams project markings on the ground defining a flagged zone around the aerial lift.

3. The aerial lift according to claim 2, wherein at least one of the markings on the ground includes a distinctive shape.

4. The aerial lift according to claim 1, wherein the light beams pointed toward the ground are less than ten meters from the edge of the members for connecting to the ground.

5. The aerial lift according to claim 1, wherein the lighting devices at least partially light the members for connecting to the ground.

6. The aerial lift according to claim 1, wherein the lighting system comprises at least one lighting device arranged on a front side of the lower portion.

7. The aerial lift according to claim 1, wherein the lighting system comprises at least one lighting device arranged on a lateral side of the lower portion.

8. The aerial lift according to claim 1, wherein a color of the colored light beams depend on the operating conditions of the aerial lift.

9. The aerial lift according to claim 1, wherein the lighting devices illuminate the ground and the immediate environment of the aerial lift over 360 degrees.

10. A method for implementing an aerial lift according to claim 1, wherein during a maneuvering operation on a worksite, for loading or unloading of the aerial lift, the lighting devices generate the light beams oriented toward the four opposite sides of the aerial lift.

* * * * *